(12) United States Patent
Hansen

(10) Patent No.: US 11,082,563 B2
(45) Date of Patent: Aug. 3, 2021

(54) PROCESS ALLOWING REMOTE RETRIEVAL OF CONTACT INFORMATION OF OTHERS VIA TELEPHONE VOICEMAIL SERVICE PRODUCT

(71) Applicant: Larry Drake Hansen, Sandy, UT (US)

(72) Inventor: Larry Drake Hansen, Sandy, UT (US)

( * ) Notice: Subject to any disclaimer, the term of this patent is extended or adjusted under 35 U.S.C. 154(b) by 347 days.

(21) Appl. No.: 14/960,422

(22) Filed: Dec. 6, 2015

(65) Prior Publication Data
US 2019/0306319 A1    Oct. 3, 2019

(51) Int. Cl.
*H04M 3/533*    (2006.01)
*H04M 1/2757*   (2020.01)

(52) U.S. Cl.
CPC ......... *H04M 3/533* (2013.01); *H04M 1/2757* (2020.01)

(58) Field of Classification Search
CPC ..... G06F 12/00; H04L 12/58; H04L 67/1095; H04M 1/274516; H04M 3/533; H04M 3/4931; G06Q 10/107
USPC ........ 370/235, 352; 379/67.1, 68, 80, 88.01, 379/88.04, 88.18, 127.01, 221.11, 355.02, 379/93.23, 201.01, 211.02; 380/271; 455/412.2, 413, 414.1, 414.4, 426.1, 418; 704/243, 275, 251, 270; 705/7.32; 709/206, 223; 340/584; 707/640, 769; 434/322
See application file for complete search history.

(56) References Cited

U.S. PATENT DOCUMENTS

| | | | | |
|---|---|---|---|---|
| 4,790,003 A | * | 12/1988 | Kepley | H04M 3/53325 379/142.01 |
| 5,412,719 A | * | 5/1995 | Hamamoto | G08B 3/1025 340/7.55 |
| 5,530,742 A | * | 6/1996 | Taylor | H04M 3/4228 379/221.11 |
| 6,163,606 A | * | 12/2000 | Otto | H04M 3/42229 379/211.02 |
| 6,389,398 B1 | * | 5/2002 | Lustgarten | G10L 15/22 379/88.01 |
| 7,251,313 B1 | * | 7/2007 | Miller | H04M 3/53333 379/281 |
| 7,729,478 B1 | * | 6/2010 | Goughian | H04M 3/53333 379/88.04 |
| 8,340,651 B1 | * | 12/2012 | Gailloux | H04L 67/04 455/418 |
| 8,447,285 B1 | * | 5/2013 | Bladon | H04L 51/32 455/414.4 |
| 9,405,843 B2 | * | 8/2016 | Isaacs | G06Q 10/107 |
| 2002/0078075 A1 | * | 6/2002 | Colson | H04L 67/1095 |
| 2005/0008136 A1 | * | 1/2005 | Dobner | H04M 3/42272 379/211.02 |
| 2005/0055403 A1 | * | 3/2005 | Brittan | H04L 29/06 709/206 |
| 2005/0060399 A1 | * | 3/2005 | Murakami | H04L 67/02 709/223 |
| 2005/0114139 A1 | * | 5/2005 | Dincer | G10L 15/26 704/270 |
| 2005/0195798 A1 | * | 9/2005 | Kirkland | H04M 3/42221 370/352 |

(Continued)

*Primary Examiner* — Gerald Gauthier

(57) ABSTRACT

A new and useful additive improvement process to telephone voicemail products, of which empowers one or more users the ability to remotely retrieve the contact information of others with one or more telephone-service-enabled devices and one or more associated voicemail service products.

1 Claim, 2 Drawing Sheets

(56) References Cited

U.S. PATENT DOCUMENTS

| | | | |
|---|---|---|---|
| 2005/0281393 A1* | 12/2005 | Kubo | H04M 3/42195 379/88.01 |
| 2006/0182245 A1* | 8/2006 | Steinmetz | G06Q 10/10 379/127.01 |
| 2006/0209695 A1* | 9/2006 | Archer, Jr. | G06F 9/50 370/235 |
| 2006/0246891 A1* | 11/2006 | Rao | H04M 3/53333 455/426.1 |
| 2007/0041370 A1* | 2/2007 | Cleveland | G06F 17/289 370/352 |
| 2007/0081636 A1* | 4/2007 | Shaffer | G06Q 10/107 379/80 |
| 2007/0280445 A1* | 12/2007 | Shkedi | H04L 12/66 379/93.23 |
| 2007/0286399 A1* | 12/2007 | Ramamoorthy | H04M 1/274516 379/355.02 |
| 2008/0101573 A1* | 5/2008 | Sylvain | H04M 3/42229 379/201.01 |
| 2008/0133235 A1* | 6/2008 | Simoneau | G10L 15/197 704/243 |
| 2008/0198975 A1* | 8/2008 | Whitehead | H04M 3/42195 379/67.1 |
| 2009/0033505 A1* | 2/2009 | Jones | G08B 25/10 340/584 |
| 2009/0112683 A1* | 4/2009 | Hamilton, II | G06Q 30/02 705/7.32 |
| 2009/0198777 A1* | 8/2009 | LaFreniere | H04L 51/30 709/206 |
| 2009/0210229 A1* | 8/2009 | Amento | G10L 13/00 704/251 |
| 2010/0304725 A1* | 12/2010 | Gueron | H04W 8/18 455/414.1 |
| 2011/0177796 A1* | 7/2011 | Jacobstein | H04M 3/42153 455/413 |
| 2012/0173566 A1* | 7/2012 | D'Angelo | G06F 16/3329 707/769 |
| 2013/0031192 A1* | 1/2013 | Caspi | H04L 65/1069 709/206 |
| 2014/0273979 A1* | 9/2014 | Van Os | H04M 3/533 455/412.2 |
| 2015/0222753 A1* | 8/2015 | Noldus | H04M 3/537 455/412.2 |
| 2015/0325138 A1* | 11/2015 | Selinger | G09B 7/00 434/322 |
| 2016/0139998 A1* | 5/2016 | Dunn | G06F 11/1451 707/640 |
| 2019/0306319 A1* | 10/2019 | Hansen | H04M 3/533 |

* cited by examiner

PROCESS ALLOWING REMOTE RETRIEVAL OF CONTACT INFORMATION OF OTHERS VIA TELEPHONE VOICEMAIL SERVICE PRODUCT

CROSS-REFERENCE TO RELATED APPLICATIONS

The current non-provisional application claims no priority to any related applications.

BACKGROUND OF THE INVENTION

In today's modern era of telephone technology, there are telephones that are connected by physical land lines, as well as those connected by satellite devices, commonly referred to as cellular phones or mobile devices. As the mobility and utility of these devices constantly increases, so does the likeliness that one will take their device with them wherever they go. A considerable amount of people carrying these devices may encounter an instance wherein said device is permanently or temporarily misplaced, stolen or broken, which causes substantial inconvenience to the property owner. Fortunately for some, the possibility exists for users' personal data (e.g. phone numbers, email addresses) to be stored digitally within a device and/or by the telephone service provider or another party in a remote server (commonly known as the 'cloud') and which is accessible to the customer, as in when said user is setting up a new phone, possibly to replace the one that may be permanently damaged, lost or stolen. The present invention relates to a user's needs in the moments immediately following misplacing, losing or damaging a mobile device. Due to what is known as "caller ID," people are generally disincentivized to remember phone numbers and are frequently forced to rely on technology to remember these data for them.

1. FIELD OF THE INVENTION

The current invention relates to the field of telephony, networks, communications and voicemail service products. Specifically, a new and useful additive process to voicemail products in which telephone-service-enabled users are able to access one or more lists of any type of stored contact data of others remotely from a telephone by calling an associated voicemail service product relative to a person's assigned phone number. The current novel process is to exist as an embedded option available within and accessed through one or more main menus of one or more users' one or more associated voicemail service products according to the disclosed process within the current application.

2. DESCRIPTION OF RELATED ART AND INFORMATION DISCLOSURE

Subsequent to an intensive search, the current disclosure was not discovered to be related to or infringe upon any previously published processes, however the novel process is coupled to and relies heavily on a wide number of widely known technologies and infrastructure.

SUMMARY OF THE INVENTION

Along with the declining use of paper phonebooks, and as more and more people become increasingly reliant on the convenience of mobile devices and the internet, there is substantially less of a need to remember things like phone numbers or email addresses, since the devices have access to and remember those data for a user after being entered and stored into the device, or possibly synchronized to a personal account for securely "backing-up" the data entered. The mobility of these devices allows for more of a possibility of them being misplaced, lost, stolen or broken, of which either situation creates severe inconveniences a user, as more and more important personal data are being stored within or are accessible through the use of the devices. Inevitably, these devices will be subjected to misplacement, loss, theft or damage, and the likelihood that a user will need the phone number of another after one of these tragedies and fail to remember the number is ever increasing. The current invention addresses users' needs by conveniently providing access to the un-stored and stored and synchronized contact information of others via an associated voicemail service product, the process of which being disclosed within.

BRIEF DESCRIPTION OF THE DRAWINGS

A more exact understanding of the current invention may possibly be ascertained from the detailed description when read in conjunction with the embodiments within the drawings.

DETAILED DESCRIPTION OF ILLUSTRATIVE EMBODIMENTS

Figure 1:
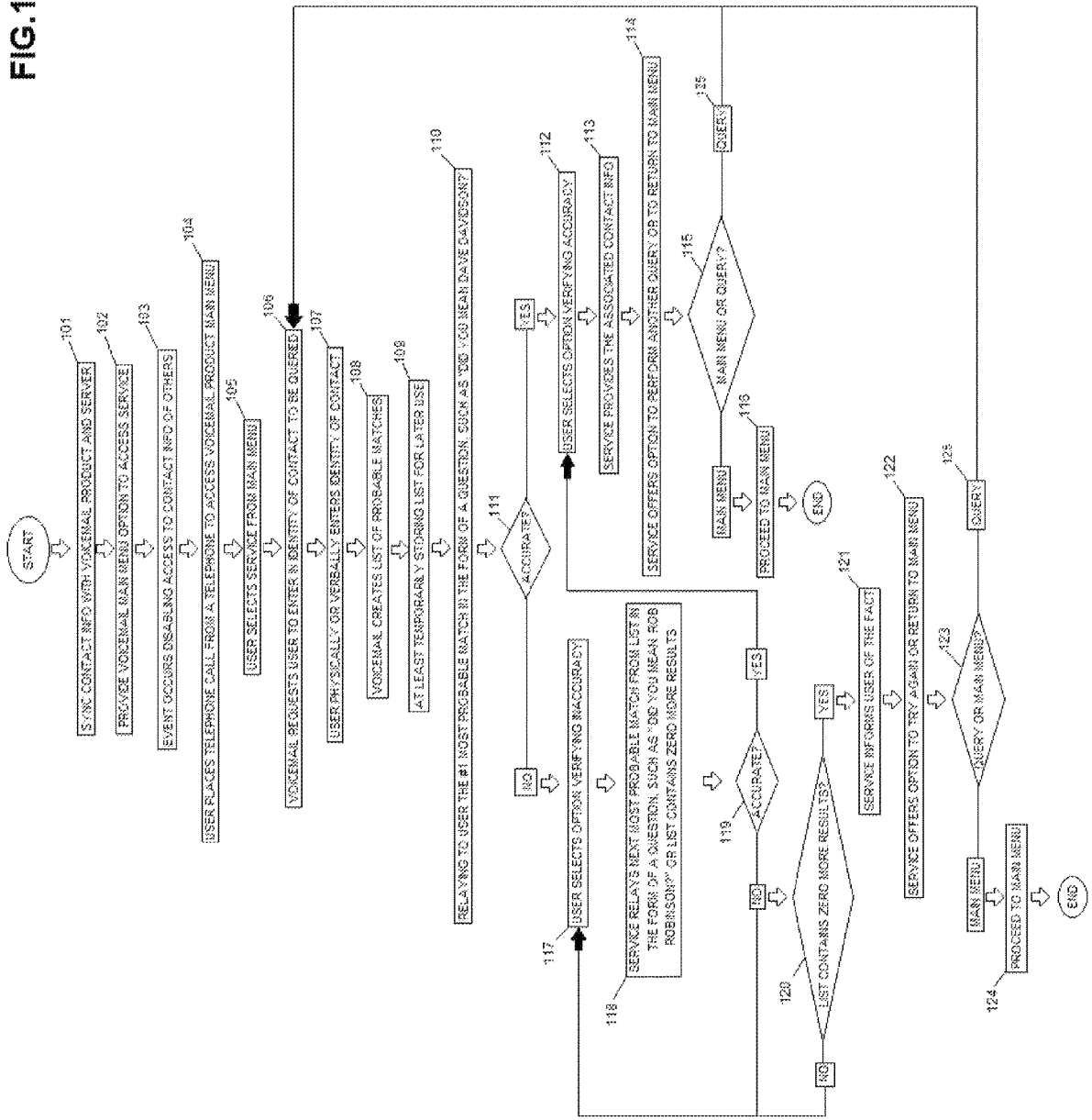
FIG. 1: Illustrates the exact process for remote retrieval of contact information of others according to the embodiments of the present invention.
Figure 2:
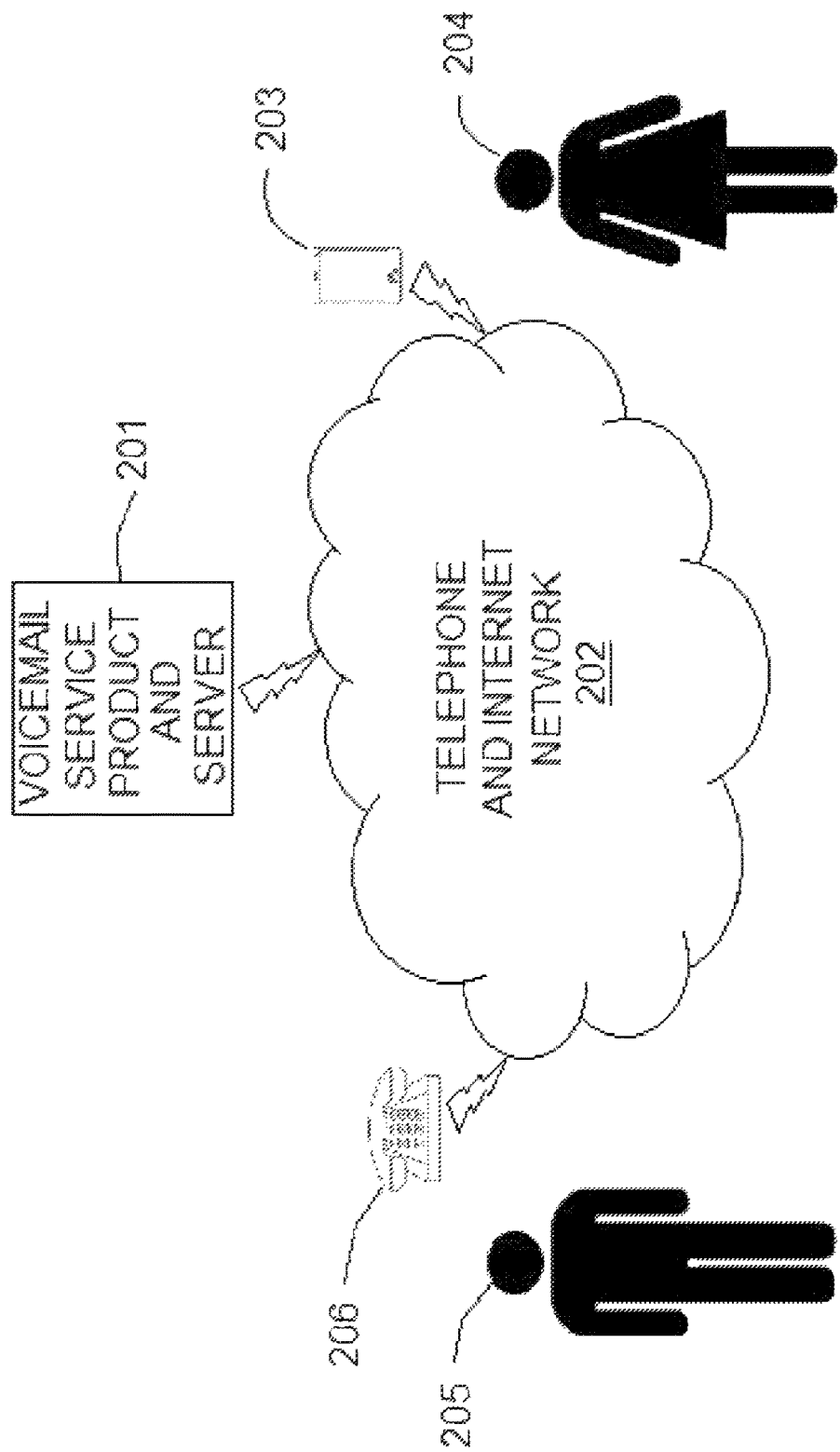
FIG. 2: A diagram of a non-limiting, exemplary network environment and actors of which remote retrieval of contact information of others is made possible.

The breadth of the Detailed Description need not limit the scope of the Claim (lettered for reference). The current disclosure is best carried out when applied to widely-known modes of existing telephone voicemail service products, telephone network systems, data services and internet service technology and is capable of immediately apprising one of ordinary skill in the art of at least the aforementioned technologies, the ability to easily understand the novel process and make and implement the process with common practices within said technologies.

A person chooses to purchase telephone service from a telephone service provider. In order to receive said service from the provider, that person must purchase a device that is capable of at least connecting to one or more telephone networks. Once a person has purchased a telephone-service-enabled device and telephone service from a telephone service provider, the provider then assigns a personally identifying number ("phone number") to the device recognizable to the telephone network. Phone numbers assigned to telephone devices are unique and important to people for telephone communication purposes, and are sometimes widely distributed to others.

It is not uncommon for a person to need multiple, even thousands of these phone numbers of other people's telephone-service-enabled devices who have been assigned a number to their personal device of which may be capable of communicating to other telephone-service-enabled devices over one or more telephone and internet networks. Many of these devices are capable of storing, accessing and relaying data, such as other phone numbers assigned to other peoples' telephone-service-enabled devices. As a convenience, it is possible for a person to enter into their device's memory system the phone numbers and personal identifying information of other peoples' phone numbers into a storage location within their device commonly referred to as a phone book or a contact list.

Many telephone-service-enabled devices are capable of connecting to, transmitting data, and receiving data over the worldwide web network comprised of multiple servers, storage devices and databases within. This fact allows the phone numbers and personal identifying information of others currently stored in a person's telephone-service-enabled device contact list to be stored in an associated remote storage device that is coupled to a server capable of transmitting, receiving and storing these data over the one or more networks associated to the person. Subsequently, these data are more secure and more easily accessed by a user.

A ubiquitous service currently available to users from at least their telephone service provider is one or more computer program products known as a 'voicemail' service. Voicemail generally is accessed by a user through a telephone-service-enabled device by placing a telephone call from their device to the product, but can also generally be accessed from another telephone-service-enabled device by calling the associated line and the line being "busy," the device being outside of wireless network coverage, the device is shut off, or after the line rings a certain number of rings, being forwarded to the voicemail service product, where during its programmed greeting, a combination of numbers may be entered to access what is known as the product's main menu. Previously, these voicemail service products were primarily purposed to simply gather information of another user whom placed a voice message, store the information of the user and the placed voice message, alert the owner of the voicemail service product of the existence of the message stored within the product and relay the message to a user.

Since the data of others within or accessible by a telephone-service-enabled device can now be stored remotely, it is now possible for the data of others to be stored in a location accessible to, if not directly a part of, a user's voicemail service product. Simply by a user allowing the voicemail service product access to the contact information of others within their telephone-service-enabled device, and/or to the remote location where the desired contact information of others is currently stored, solves an important problem in today's society.

As the contact information of others can be stored in a device or remotely accessible to a device, it becomes seemingly unnecessary for a user to be forced to memorize the information. Without the regular recalling of this information, most ordinary people will, over time, fail to recall this information.

Telephone-service-enabled devices are increasingly becoming known as 'mobile devices.' These are generally small, thin, fragile and incredibly complex and expensive computers, capable of becoming misplaced, stolen, lost or damaged. The current disclosure addresses the problem of the telephone-service-enabled device being misplaced, stolen, lost or damaged and, at which time a user immediately needs to access the contact information of others currently stored in the telephone-service-enabled device or remotely accessible to the device and, at which point a user fails to recall or otherwise be able to access the needed contact information. The current predicament is solved by way of enabling one or more users and one or more voicemail-service products coupled to one or more telephone-service-enabled devices by a telephone and/or internet network 202, the ability to perform the disclosed novel process as portrayed by FIG. 1, as claimed and as thoroughly explained in the following paragraphs.

In one embodiment, one or more users, in this case, at least user 205 must digitally synchronize, in a manner exemplary of but not necessarily or limited to one or more embodiments of U.S. Pat. No. 7,761,414B2/8,046,498B2, his or her contact information of others 101 of at least user 204, within one or more telephone-service-enabled devices 203 with one or more associated voicemail service products and servers 201 "capable of [at least] storage and distribution of data (U.S. Pat. No. 4,124,773)," by utilizing one or more telephone and internet networks 202 of at least the contact information of user 204. Telephone and internet network 202 may be any type of network capable of providing services to devices of any type and represents any number of interconnected networks that may be composed of any number and type of wired or wireless telephone-service-enabled devices. Further, telephone and internet network 202 may enable devices 203/206 to communicate with at least voicemail service product and server by including, but not limited to, human voice, automated voice, data, and any combination thereof.

In another embodiment, one or more users, in this case, at least user 205 need not digitally synchronize his or her contact information of others 101 of at least user 204, within one or more telephone-service-enabled devices 203 with one or more associated voicemail service products and servers 201. Rather, one or more users are able to access contact information of others via at least telephone-service-enabled device 203/206, and one or more associated voicemail service products and servers 201 that are connected to network 202 of which is capable of apprising voicemail service product and server 201 of the contact information of others as requested to be, and queried by one or more users 204/205.

Voicemail service product and server 201 is configured by one of ordinary skill in the pertinent art to provide to at least user 205 a voicemail main menu option 102 capable of accessing the invented service process in order for at least user 205 to access his or her contact information of at least user 204 in the event 103 at least user 205 is disabled from accessing his or her said contact information at least user 204. Following event 103, user 205 places a telephone call from another telephone-service-enabled device, exemplary, but not limited to device 203/206, through telephone and internet network 202 to access at least user 205's one or more voicemail service products and servers 201.

Currently in the process, at least user 205 physically, verbally or in any conceivable manner, selects voicemail main menu option 102 from main menu of one or more voicemail service products and servers 201 with one or more telephone-service-enabled devices 203/206. 201 requests at least user 205 to enter any combination of pertinent identifying data of at least contact 204 as presented in 106. At least user 205 physically, verbally or in any conceivable manner, provides identifying data of at least contact 204 to at least product 201 (107). Product 201 is configured in a manner to, at this time; create a data list of one or more probable matches 108, similarly to a "Google®" search; and at least temporarily storing said list for later use 109 in the current process. Product 201 relays to at least user 205 the most probable match contained in list 108 as opposed to the identifying data of at least contact 204 provided in 107 in the form of a question 110 intended to confirm the accuracy of the most probable match. Inaccuracy or accuracy of the most probable result of list 108 is confirmed by at least user 205's input in response to question 110 indicating a success or failure of accuracy.

In the event inaccuracy 111 is indicated and selected by at least user 205 from an option provided by product 201 verifying inaccuracy 117, product 201 relays the next most probable match from list 108 in any form of a question, unless list 108 contains zero more probable results 120.

If list 108 contains zero more results, voicemail service product and server 201 informs at least user 205 of the pertinent fact 121 and proceeds to offer an option to query again or to return to voicemail main menu 122. Should the main menu option be selected, voicemail service product proceeds to main menu 124. At least user 205 at that time can terminate the current process, or proceed to 105 if so desired. Should the option to query 125 again be selected by at least user 205, the current process reverts to 106 and requests one or more users to physically, verbally or in any conceivable manner, enter the identifying alphanumeric characters of the contact information to be queried and continues through this process until an end is made. If list 108 contains zero more results following inaccuracy, process reverts to 117. In the event accuracy 119 is indicated and selected by at least user 205, process forwards to 112 where user selects option verifying accuracy.

In the event question 110 is accurate 111, at least user 205 selects an option provided by one or more voicemail service products and servers 201 to verify the accuracy of the identifying data provided 112. At least product 201 at that time provides the contact information associated with the identifying data provided 113.

The one or more contact information of others 113 existing in utmost importance and purpose to at least user 205 and of the current process, respectively (emphasis added).

At least voicemail service product and server 201 proceeds to offer to, at least user 205, the option to perform another query or return to main menu 115.

Shall query 125 be selected by at least user 205, the current process reverts to 106 and one or more voicemail service products and servers 201 again requests at least user 205 to physically, verbally or in any conceivable manner, enter identifying data of one or more contacts to be queried.

Shall option 116 be selected by at least user 205, at least user 205 at that time can terminate the current process, or proceed to 105 if so desired. Thus, the current process may be recycled or terminated by no less than and at least user 205's discretion.

The invention claimed is:

1. A process comprising:
the retrieval of a user's currently synchronized and unsynchronized contact data of others stored within and otherwise accessible by a user's telephone-service-enabled device, from a user's associated telephone voicemail service product, wherein comprising the active steps of:
(A) a voicemail service product is configured with capabilities of accessing, querying, storing, organizing and relaying synchronized and unsynchronized contact data of others currently synchronized with or otherwise accessible to a user's telephone-service-enabled device via the internet;
(B) a user's contact data of others currently stored within a user's telephone-service-enabled device may be synchronized with a user's voicemail service product;
(C) a telephone voicemail service product main menu option is provided within a telephone voicemail service product of which, when selected by a user, allows access to complete the current process;
(D) an event occurs, disabling a user's access to his or her contact information of others currently stored within and accessible by a user's telephone-service-enabled device;
(E) a user places a telephone call from a telephone-service-enabled device, gaining access to a user's telephone voicemail service product;
(F) telephone voicemail service product main menu option identifying the current invention is selected by a user;
(G) telephone voicemail service product requests from a user, in a language familiar to a user, to enter the corresponding identifying data associated with the contact data to be queried;
(H) a user enters corresponding identifying data, creating the content of the query;
(I) telephone voicemail service product receives and processes data entered by a user;
(J) telephone voicemail service product internally creates at least one list (J) of probable matches as compared to data entered;
(K) telephone voicemail service product at least temporarily storing said list of probable matches for later use;
(L) telephone voicemail service product provides to a user the most probable result from list (J) of probable matches in the form of a question that is worded in a manner intended to confirm the accuracy of the provided result to a user, and provides an option to confirm accuracy or inaccuracy;
(M) shall the result provided be accurate, a user shall select the option verifying the accuracy of the resulting identity provided;
(N) telephone voicemail service product provides the associated contact data queried;
(O) upon completion of providing queried contact data, telephone voicemail service product provides the options to repeat the information provided, to perform another query reverting the process to step (G), to return to the voicemail service product main menu or to terminate the connection, at which point a user makes a decision among the options, thereby potentially ending the current process; and
(P) shall the provided result be inaccurate or undesirable to a user, a user shall at that time select the option verifying the inaccuracy or undesirability of the resulting identity provided;
(Q) voicemail service product provides the next most probable result from list (J) in the form of a question that is worded in a manner intended to confirm the accuracy of the current result provided;
(R) shall the next most probable provided result provided in step (P) be accurate and desired by a user, telephone voicemail service product reverts to step (M);
(S) shall the next most probable result provided be indicated as inaccurate or undesirable to user, telephone voicemail service product proceeds to repeat steps (P), (Q) and (S), until list (J) contains zero more results to convey to a user; and
(T) shall list created in step (J) contain zero results, telephone voicemail product shall inform a user of the fact and proceed to offer a user the options to return to step (G), return to telephone voicemail service product main menu or to terminate the connection, at which point a user makes a decision among the options, thereby potentially ending the current process.

* * * * *